United States Patent
Maeda et al.

(10) Patent No.: US 11,960,938 B2
(45) Date of Patent: Apr. 16, 2024

(54) INFORMATION PROCESSING PROGRAM, INFORMATION PROCESSING APPARATUS, AND INFORMATION PROCESSING METHOD THAT OPTIMIZE ACCESS TO AN EXTERNAL DATABASE BASED ON CALCULATED MINIMUM PROCESSING LOAD

(71) Applicant: FUJITSU LIMITED, Kawasaki (JP)

(72) Inventors: Takuma Maeda, Kobe (JP); Kazuhiro Taniguchi, Kawasaki (JP); Junji Kawai, Kakogawa (JP)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 17/244,007

(22) Filed: Apr. 29, 2021

(65) Prior Publication Data
US 2021/0406072 A1    Dec. 30, 2021

(30) Foreign Application Priority Data
Jun. 30, 2020   (JP) .................................. 2020-113084

(51) Int. Cl.
*G06F 9/50*    (2006.01)
*G06F 9/48*    (2006.01)
(Continued)

(52) U.S. Cl.
CPC ............ *G06F 9/505* (2013.01); *G06F 9/4881* (2013.01); *G06F 9/5038* (2013.01); *G06F 16/2282* (2019.01); *G06F 16/2445* (2019.01)

(58) Field of Classification Search
CPC .. G06F 9/505; G06F 16/2282; G06F 16/2445; G06F 9/4881; G06F 9/5038
See application file for complete search history.

(56) References Cited

U.S. PATENT DOCUMENTS

| 4,769,772 A | 9/1988 | Dwyer |
| 5,412,806 A | 5/1995 | Du et al. |

(Continued)

FOREIGN PATENT DOCUMENTS

| JP | 6-195382 A | 7/1994 |
| JP | 2002-318737 A | 10/2002 |

(Continued)

OTHER PUBLICATIONS

Extended European Search Report dated Oct. 20, 2021, in European Application No. 21170629.6.

(Continued)

*Primary Examiner* — Meng Ai T An
*Assistant Examiner* — Zujia Xu
(74) *Attorney, Agent, or Firm* — STAAS & HALSEY LLP

(57) ABSTRACT

Disclosed system specifies, based on measurement results of communication times taken for accessing a plurality of external databases, relation between the communication times taken for accessing the plurality of external databases, calculates, when accepting an instruction to execute processing using at least one of the plurality of external databases, a processing load when accessing the at least one of the external databases, based on the relation between the communication times, and controls an access to data included in the at least one of the external databases according to the calculated processing load.

13 Claims, 20 Drawing Sheets

(51) Int. Cl.
    *G06F 16/22*     (2019.01)
    *G06F 16/242*    (2019.01)

(56) References Cited

U.S. PATENT DOCUMENTS

| | | | | |
|---|---|---|---|---|
| 6,256,644 | B1* | 7/2001 | Shibayama | G06F 16/9017 |
| | | | | 707/E17.037 |
| 7,805,465 | B2* | 9/2010 | Dettinger | G06F 16/9032 |
| | | | | 707/810 |
| 2002/0032777 | A1* | 3/2002 | Kawata | H04L 67/1008 |
| | | | | 709/219 |
| 2004/0122807 | A1* | 6/2004 | Hamilton | G06F 16/3325 |
| 2006/0080568 | A1* | 4/2006 | Subbaraman | G06F 11/2023 |
| | | | | 714/E11.073 |
| 2006/0195416 | A1 | 8/2006 | Ewen et al. | |
| 2010/0313207 | A1* | 12/2010 | Tanaka | G06F 9/5038 |
| | | | | 719/313 |
| 2012/0246656 | A1* | 9/2012 | Elliott | G06F 9/4881 |
| | | | | 718/102 |
| 2013/0198380 | A1* | 8/2013 | Oono | G06F 11/0709 |
| | | | | 709/224 |
| 2016/0154848 | A1 | 6/2016 | Shimizu et al. | |
| 2016/0371332 | A1* | 12/2016 | Li | G06F 16/24554 |
| 2018/0337927 | A1* | 11/2018 | Carnahan | H04L 41/044 |
| 2020/0285642 | A1* | 9/2020 | Bei | G06F 11/302 |
| 2022/0091902 | A1* | 3/2022 | Guo | G06F 9/5077 |
| 2022/0300509 | A1 | 9/2022 | Iwakoshi et al. | |

FOREIGN PATENT DOCUMENTS

| | | |
|---|---|---|
| JP | 2011-176595 A | 9/2011 |
| JP | 7295461 B2 | 6/2023 |
| WO | WO 2016/167999 A1 | 10/2016 |
| WO | WO 2021/038795 A1 | 3/2021 |

OTHER PUBLICATIONS

Japanese Office Action dated Nov. 28, 2023 for Japanese Application No. 2020-113084.

* cited by examiner

FIG. 14

| TYPE | UNIT | COST | MEASUREMENT TIME (ms) |
|---|---|---|---|
| SEQUENTIAL SCAN | PAGE | 1 | |
| INDEX SCAN | PAGE | 4 | |
| CPU | ROW | 0.01 | |

FIG. 15

| TYPE | UNIT | COST | MEASUREMENT TIME (ms) |
|---|---|---|---|
| SEQUENTIAL SCAN | PAGE | 1 | <u>10</u> |
| INDEX SCAN | PAGE | 4 | - |
| CPU | ROW | 0.01 | - |

FIG. 16

| TYPE | UNIT | COST | MEASUREMENT TIME (ms) |
|---|---|---|---|
| SEQUENTIAL SCAN | PAGE | 1 | 10 |
| INDEX SCAN | PAGE | 4 | - |
| CPU | ROW | 0.01 | - |
| COMMUNICATION (EXTERNAL DB 3a) | ROW | 0.5 | 5 |

FIG. 17

| TYPE | UNIT | COST | MEASUREMENT TIME (ms) |
|---|---|---|---|
| SEQUENTIAL SCAN | PAGE | 1 | 10 |
| INDEX SCAN | PAGE | 4 | - |
| CPU | ROW | 0.01 | - |
| COMMUNICATION (EXTERNAL DB 3a) | ROW | 0.5 | 5 |
| COMMUNICATION (EXTERNAL DB 3b) | ROW | 0.1 | 1 |
| COMMUNICATION (EXTERNAL DB 3c) | ROW | 0.2 | 2 |

FIG. 18

| TABLE NAME | THE NUMBER OF RECORDS | THE NUMBER OF COLUMNS | ... |
|---|---|---|---|
| TBL101 | 2000 | 10 | ... |
| TBL102 | 500 | 5 | ... |
| TBL103 | 10000 | 20 | ... |
| TBL104 | 100 | 15 | ... |
| TBL105 | 800 | 5 | ... |
| ... | ... | ... | ... |

FIG. 19

| TABLE NAME | THE NUMBER OF RECORDS | THE NUMBER OF COLUMNS | ... |
|---|---|---|---|
| TBL201 | 700 | 5 | ... |
| TBL202 | 1000 | 10 | ... |
| TBL203 | 1500 | 10 | ... |
| TBL204 | 20000 | 15 | ... |
| TBL205 | 500 | 10 | ... |
| ... | ... | ... | ... |

FIG. 20

| SEARCH METHOD | JOIN METHOD | ... |
|---|---|---|
| SEQUENTIAL SCAN | NESTED LOOP JOIN | ... |
| INDEX SCAN | NESTED LOOP JOIN | ... |
| SEQUENTIAL SCAN | SORT-MERGE JOIN | ... |
| INDEX SCAN | SORT-MERGE JOIN | ... |
| SEQUENTIAL SCAN | HASH JOIN | ... |
| ... | ... | ... |

INFORMATION PROCESSING PROGRAM, INFORMATION PROCESSING APPARATUS, AND INFORMATION PROCESSING METHOD THAT OPTIMIZE ACCESS TO AN EXTERNAL DATABASE BASED ON CALCULATED MINIMUM PROCESSING LOAD

CROSS-REFERENCE TO RELATED APPLICATION

This application is based upon and claims the benefit of priority of the prior Japanese Patent Application No. 2020-113084, filed on Jun. 30, 2020, the entire contents of which are incorporated herein by reference.

FIELD

The embodiment discussed herein is related to an information processing program, an information processing apparatus, and an information processing method.

BACKGROUND

For example, a business operator that provides a service to a user (hereinafter, also simply referred to as business operator) constructs a business system needed for providing the service. For example, the business operator constructs a business system that combines a plurality of types of databases (DBs) for the purpose of utilizing big data, and the like.

Then, when constructing a business system as described above, the business operator constructs a multi-database using, for example, a database (hereinafter, also referred to as management database) that manages the plurality of types of databases in an integrated manner. For example, the business operator constructs a multi-database by performing external database virtualization in which each of the plurality of types of databases is deployed in an external database (an externally prepared database accessible from the management database).

With this configuration, the user may also use data stored in the plurality of types of databases (hereinafter, also referred to as external databases) by accessing the management database. Therefore, the business operator may suppress a development cost and the like of an application for accessing the data stored in the external databases (for example, refer to Patent Documents 1 to 3). Japanese Laid-open Patent Publications No. 06-195382, No. 2011-176595, and No. 2002-318737 are disclosed as related art.

SUMMARY

According to an aspect of the embodiments, an information processing method comprises: specifying, based on measurement results of communication times taken for accessing a plurality of external databases, relation between the communication times taken for accessing the plurality of external databases; calculating, when accepting an instruction to execute processing using at least one of the plurality of external databases, a processing load when accessing the at least one of the external databases, based on the relation between the communication times; and controlling an access to data included in the at least one of the external databases according to the calculated processing load.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating a specific example of cost information 134;

FIG. 15 is a diagram illustrating a specific example of the cost information 134;

FIG. 16 is a diagram illustrating a specific example of the cost information 134;

FIG. 17 is a diagram illustrating a specific example of the cost information 134;

FIG. 18 is a diagram illustrating a specific example of statistical information 132;

FIG. 19 is a diagram illustrating a specific example of the statistical information 132; and FIG. 20 is a diagram illustrating a specific example of execution plan 133.

DESCRIPTION OF EMBODIMENTS

Here, for example, at a periodical timing, the business operator collects statistical information, which is information indicating the number of records, the number of columns, and the like of tables stored in each database, from each of the management database and the external databases. For example, when the business operator inputs a query, the management database refers to the statistical information corresponding to each database to determine an execution plan to be used when executing the input query. Thereafter, the management database executes the input query by following the determined execution plan.

A cost of communication with each of the external databases as described above (hereinafter, also referred to as communication cost) may differ depending on a deployment position and the like of each database. Therefore, in order to adopt an execution plan that enables optimization of access to the external databases, it is preferable that the management database consider not only information included in the statistical information collected from each database but also the communication cost corresponding to each of the external databases.

Thus, in one aspect, an object of the embodiment is to provide an information processing program, an information processing apparatus, and an information processing method that enable optimization of access to an external database.

[Configuration of Information Processing System]

Figure 1:
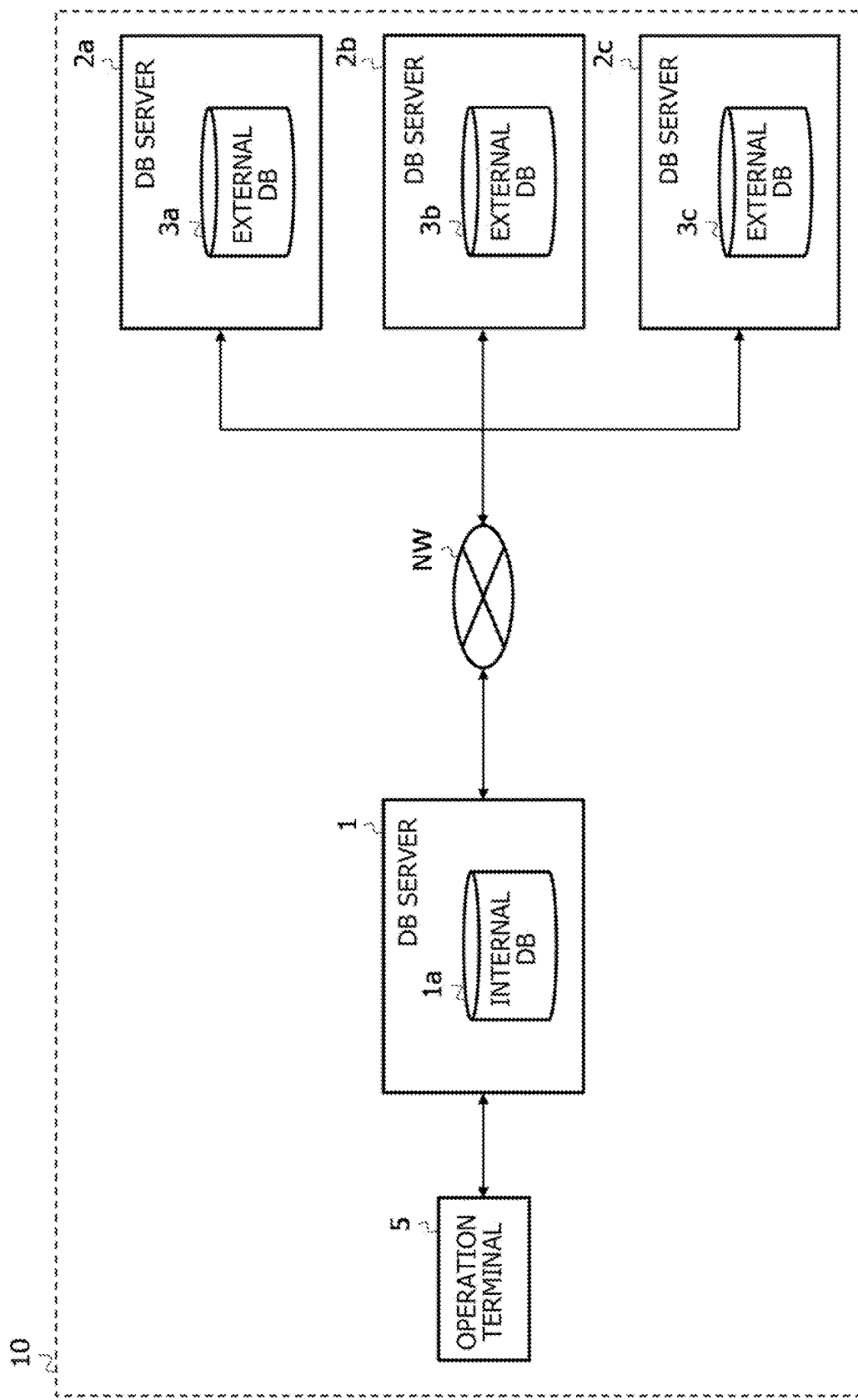
FIG. 1 is a diagram illustrating a configuration of an information processing system 10.
Figure 2:
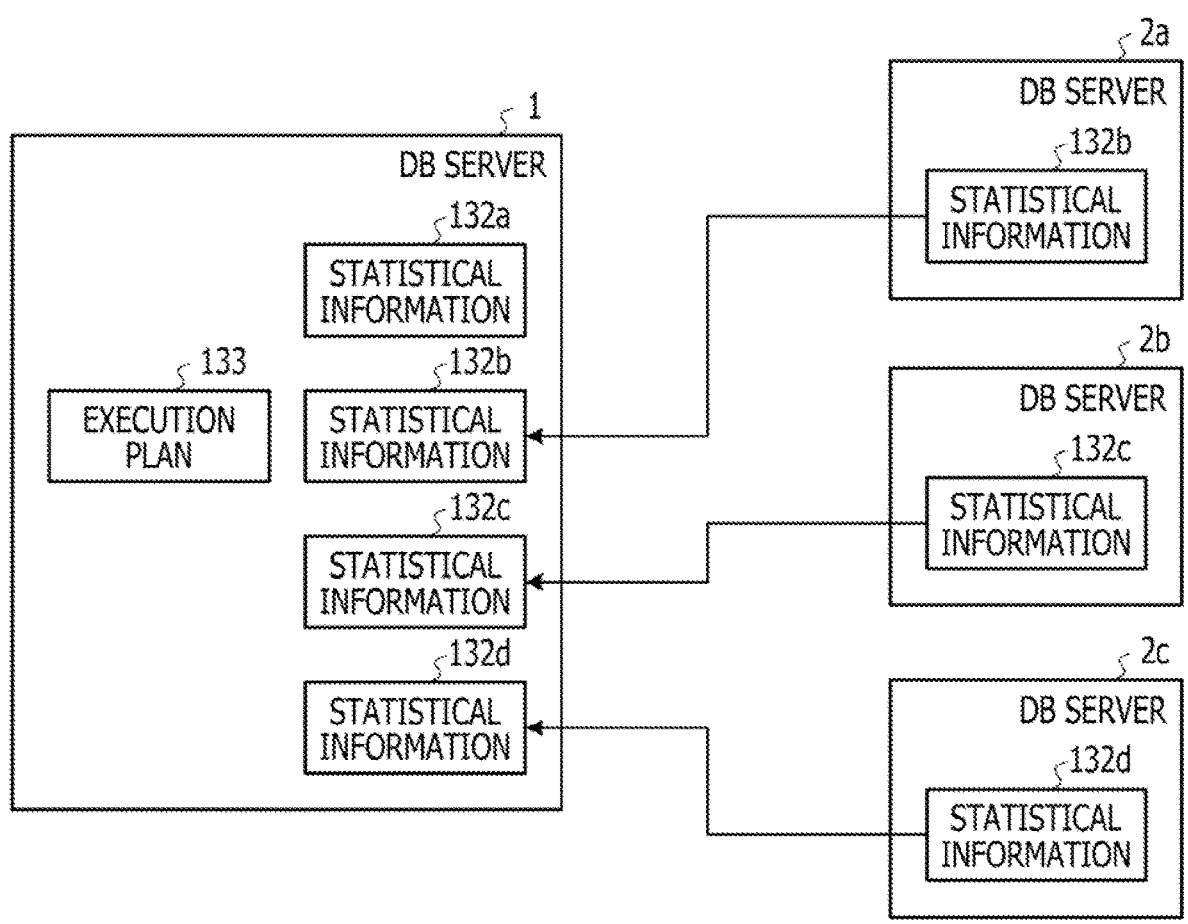
FIG. 2 is a diagram illustrating the configuration of the information processing system 10.

First, a configuration of an information processing system 10 will be described. FIGS. 1 and 2 are diagrams illustrating the configuration of the information processing system 10.

In the example illustrated in FIG. 1, the information processing system 10 includes a database (DB) server 1 (hereinafter, also referred to as first DB server 1 or information processing apparatus 1), a DB server 2a, a DB server 2b, and a DB server 2c. Each of the DB servers 2a, 2b, and 2c may communicate with the DB server 1 via a network NW such as the Internet. The information processing system 10 also includes an operation terminal 5 that receives input and the like of various types of information by a business operator.

The DB server 1 includes a management DB 1a (hereinafter, also referred to as internal DB 1a). In addition, the DB servers 2a, 2b, and 2c include external DBs 3a, 3b, and 3c, respectively.

Note that, hereinafter, a case where the internal DB 1a is provided inside the DB server 1 will be described, but the internal DB 1a may be provided outside the DB server 1. In addition, hereinafter, a case where the external DBs 3a, 3b, and 3c (hereinafter, these are also collectively referred to as external DBs 3) are respectively provided inside the DB servers 2a, 2b, and 2c (hereinafter, these are also collectively referred to as DB servers 2 or second DB servers 2) will be described, but the external DBs 3 may be provided outside the DB servers 2. Furthermore, hereinafter, a case where the information processing system 10 includes the three external DBs (external DBs 3a, 3b, and 3c) will be described, but the information processing system 10 may include the number of external DBs 3 other than three.

Each of the internal DB 1a and the external DBs 3 is a database that stores data to be subjected to various types of operations (insertion, update, deletion, and the like) by the business operator. For example, the internal DB 1a and the external DBs 3 store data corresponding to data models different from each other. Furthermore, for example, the internal DB 1a and the external DBs 3 are different types of database servers that store log data transmitted from an Internet of Things (IoT) sensor, business data (document) input by the business operator via the operation terminal 5, sound data input by the business operator via the operation terminal 5, and the like.

Here, for example, at a periodical timing, the business operator collects statistical information indicating the number of records, the number of columns, and the like of tables stored in each database, from each of the internal DB 1a and the external DBs 3. Then, when a query requesting access to each database is input, for example, the DB server 1 refers to the statistical information corresponding to each database to determine an execution plan to be used for executing the input query.

For example, as illustrated in FIG. 2, the DB server 1 refers to statistical information 132a for the DB server 1 (internal DB 1a), and statistical information 132b, statistical information 132c, and statistical information 132d for the DB servers 2 (external DBs 3) to determine an execution plan 133 to be used for executing the query.

Thereafter, the DB server 1 executes the input query by following the determined execution plan 133.

However, a cost of communication with each of the external DBs 3 may differ depending on a deployment position and the like of each database. Therefore, in order to adopt an execution plan that enables optimization of access to the external DBs 3, it is preferable that the DB server 1 consider not only information included in the statistical information 132a, 132b, 132c, and 132d (hereinafter, these are also collectively referred to simply as statistical information 132) collected from each database but also the communication cost corresponding to each of the external DBs 3. Thus, it is preferable that the DB server 1 accurately calculate relation between the communication costs corresponding to the external DBs 3.

Therefore, the DB server 1 in the present embodiment specifies relation between communication times taken for accessing the plurality of external DBs 3 based on measurement results of the communication times taken for accessing the plurality of external DBs. Then, when accepting processing using at least one of the plurality of external DBs 3, the DB server 1 calculates a processing load when performing access based on the specified relation between the communication times.

Thereafter, the DB server 1 controls access to data included in at least one of the plurality of external DBs 3 according to the calculated processing load.

For example, before accepting input of the query to be executed, the DB server 1 in the present embodiment calculates in advance the relation between the communication times taken for accessing the external DBs 3 from measurement results of the communication times taken for accessing the external DBs 3.

Then, when accepting input of the query to be executed, the DB server 1 refers to the relation between the communication times calculated in advance to calculate a processing load when executing the query to be executed by considering processing loads accompanying communication between the DB server 1 and the DB servers 2. Thereafter, based on the calculated processing load, for example, the DB server 1 determines the execution plan 133 to be used for executing the query to be executed.

With this configuration, the DB server 1 may appropriately select the execution plan 133 to be used for executing the query to be executed. Therefore, the DB server 1 may optimize access to the external DBs 3 accompanying execution of the query to be executed.

[Hardware Configuration of Information Processing System]

Figure 3:
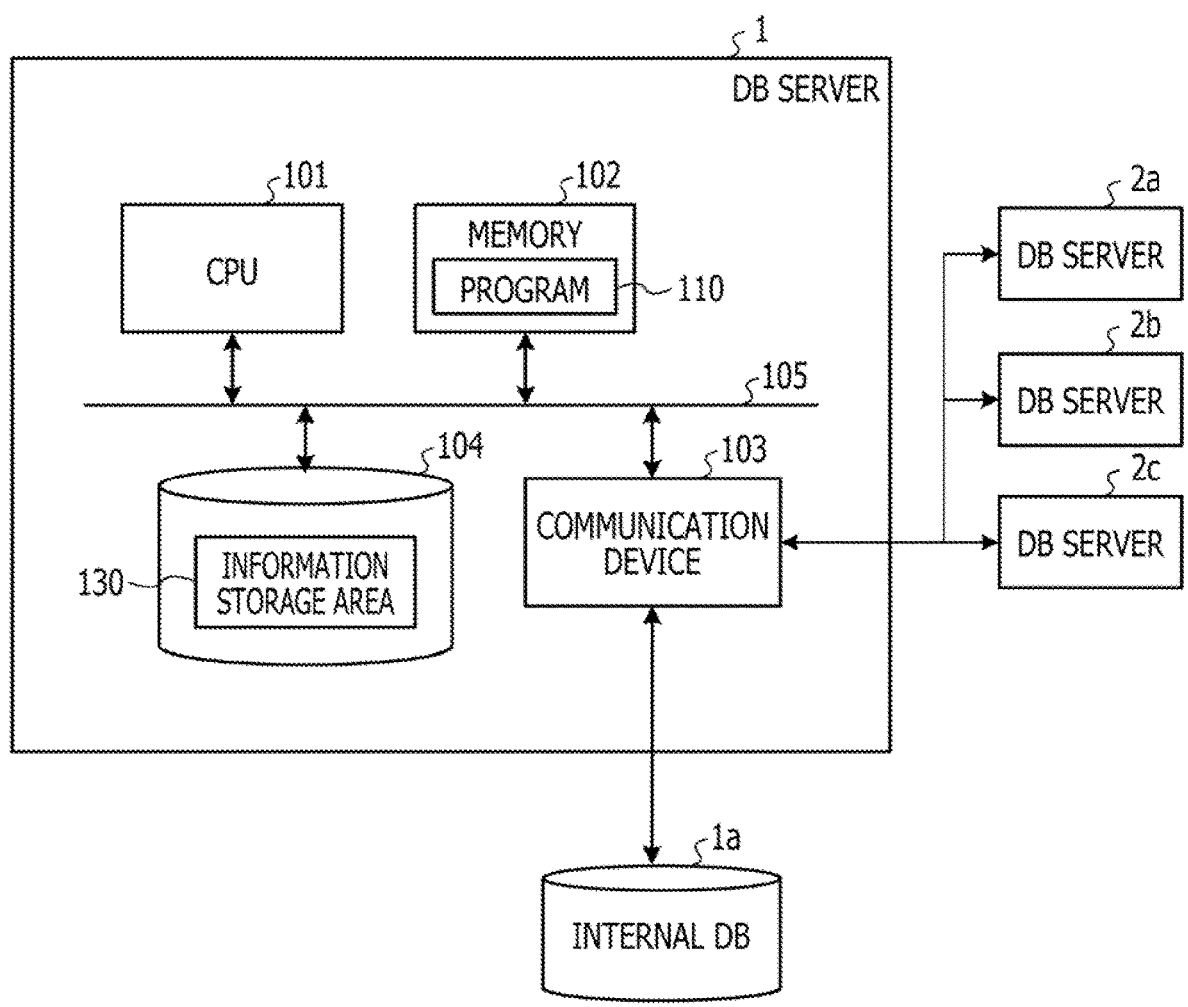
FIG. 3 is a diagram illustrating a hardware configuration of a database (DB) server 1.
Figure 4:
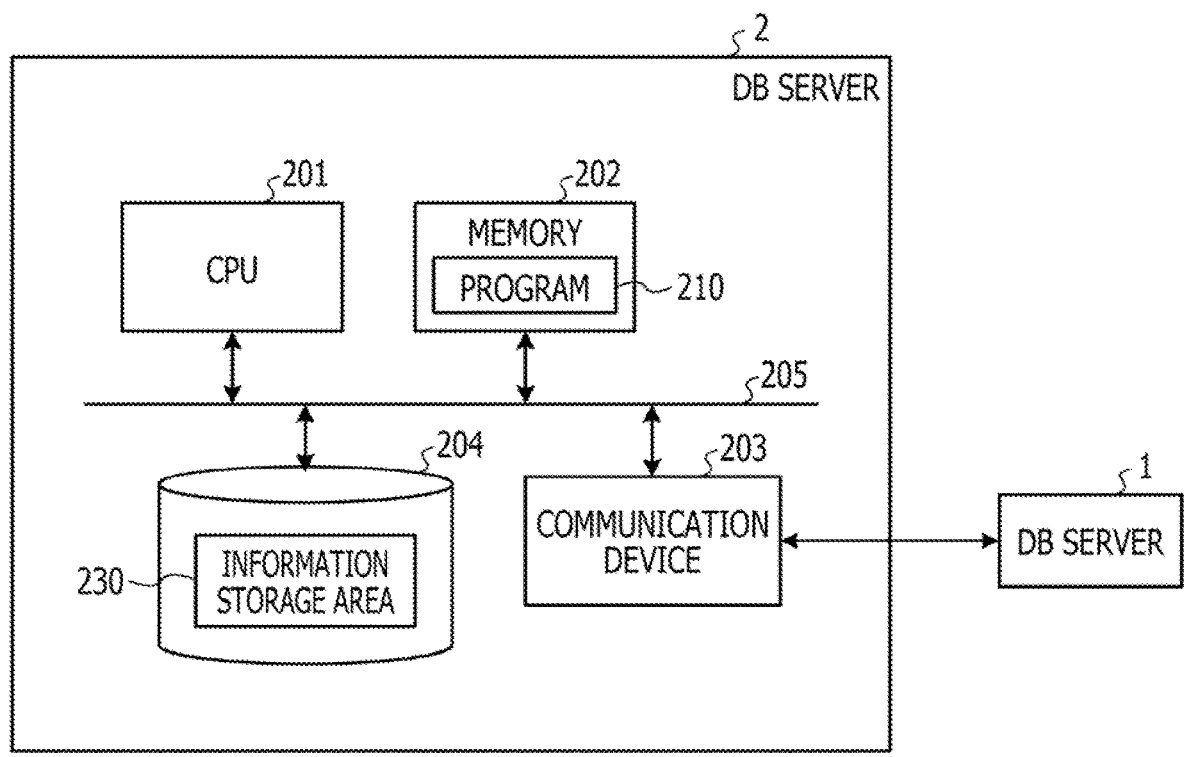
FIG. 4 is a diagram illustrating a hardware configuration of a DB server 2.

Next, a hardware configuration of the information processing system 10 will be described. FIG. 3 is a diagram illustrating a hardware configuration of the DB server 1. In addition, FIG. 4 is a diagram illustrating a hardware configuration of the DB servers 2.

First, the hardware configuration of the DB server 1 will be described.

As illustrated in FIG. 3, the DB server 1 includes a central processing unit (CPU) 101, which is a processor, a memory 102, a communication device 103, and a storage medium 104. The respective units are interconnected via a bus 105.

The storage medium 104 has, for example, a program storage area (not illustrated) that stores a program 110 for performing processing of controlling access accompanying execution of a query (hereinafter, also referred to as access control processing). In addition, the storage medium 104 has, for example, an information storage area 130 that stores information used when the access control processing is performed. Note that the storage medium 104 may be, for example, a hard disk drive (HDD) or a solid state drive (SSD).

The CPU 101 executes the program 110 loaded from the storage medium 104 into the memory 102 to perform the access control processing.

In addition, for example, the communication device 103 accesses the internal DB 1*a* via a network (not illustrated). Furthermore, for example, the communication device 103 accesses each of the DB servers 2*a*, 2*b*, and 2*c* via a network (not illustrated).

Next, the hardware configuration of the DB server 2 will be described.

As illustrated in FIG. 4, the DB server 2 includes a CPU 201, which is a processor, a memory 202, a communication device 203, and a storage medium 204. The respective units are interconnected via a bus 205.

The storage medium 204 has, for example, a program storage area (not illustrated) that stores a program 210 for performing the access control processing. In addition, the storage medium 204 has, for example, an information storage area 230 that stores information used when the access control processing is performed. Note that the storage medium 204 may be, for example, an HDD or an SSD.

The CPU 201 executes the program 210 loaded from the storage medium 204 into the memory 202 to perform the access control processing.

In addition, the communication device 203 communicates with the DB server 1 via a network (not illustrated), for example.

[Functions of Information Processing System]

Figure 5:
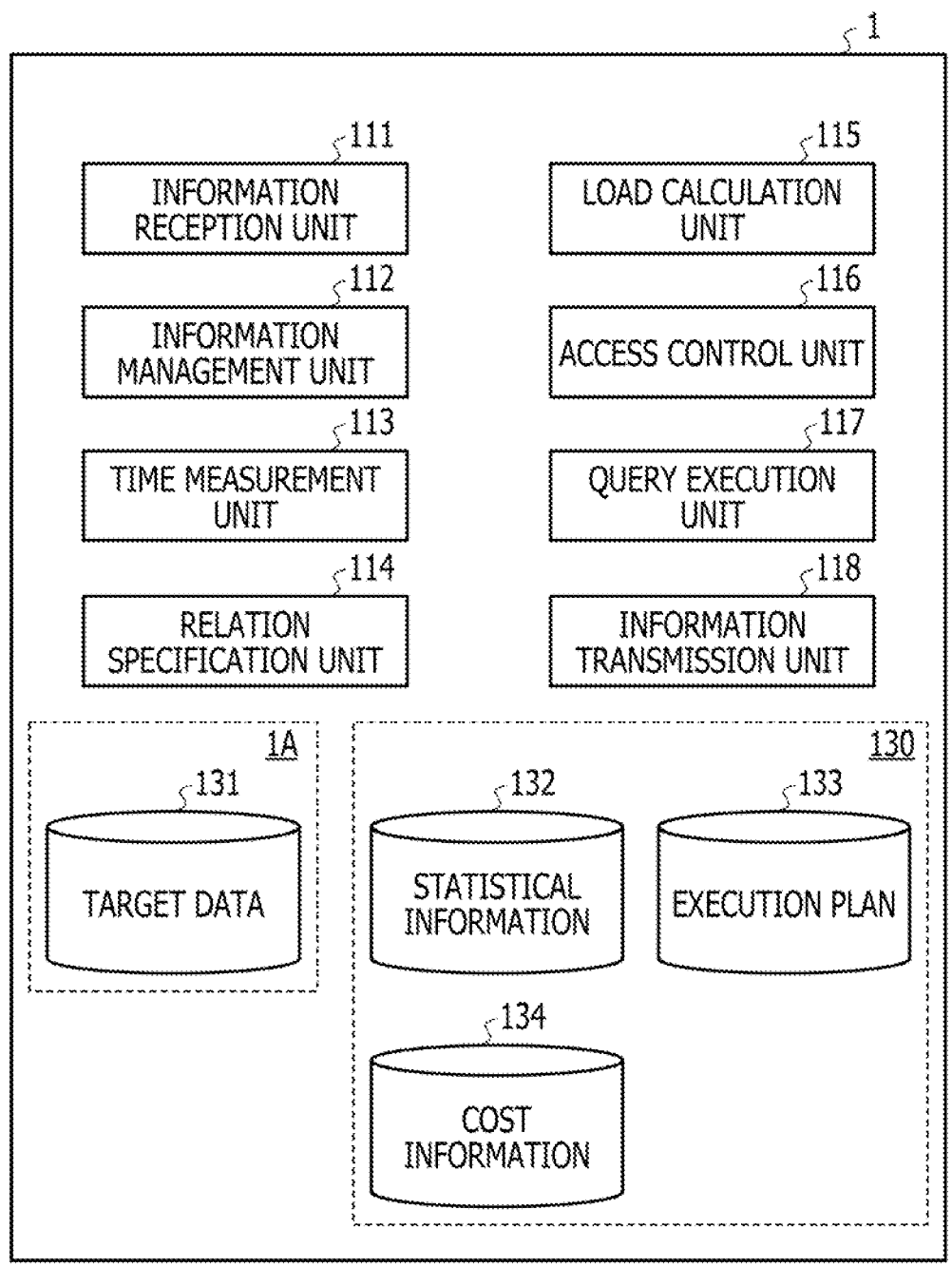
FIG. 5 is a block diagram of functions of the DB server 1.
Figure 6:
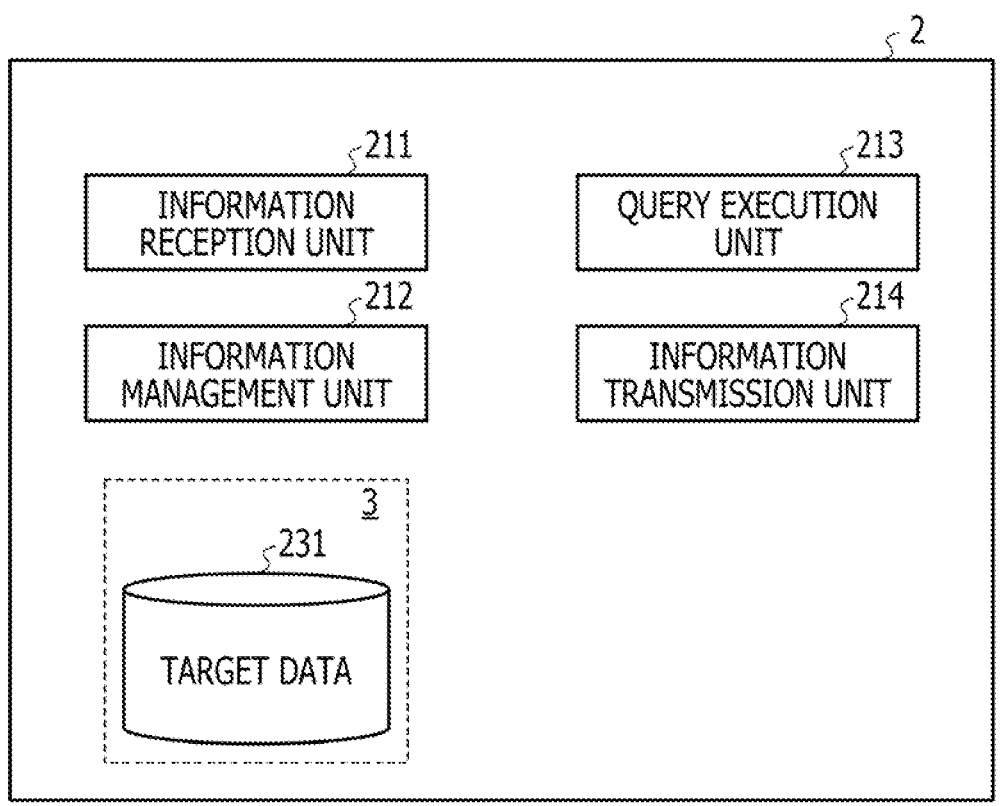
FIG. 6 is a block diagram of functions of the DB server 2.

Next, functions of the information processing system 10 will be described. FIG. 5 is a block diagram of functions of the DB server 1. In addition, FIG. 6 is a block diagram of functions of the DB server 2.

First, the block diagram of the functions of the DB server 1 will be described.

As illustrated in FIG. 5, for example, in organic collaboration between hardware such as the CPU 101 and the memory 102 and the program 110, the DB server 1 implements various types of functions including an information reception unit 111, an information management unit 112, a time measurement unit 113, and a relation specification unit 114. In addition, for example, in organic collaboration between the hardware such as the CPU 101 and the memory 102 and the program 110, the DB server 1 implements various types of functions including a load calculation unit 115, an access control unit 116, a query execution unit 117, and an information transmission unit 118.

In addition, as illustrated in FIG. 5, for example, the DB server 1 stores target data 131 in the internal DB 1*a*. Furthermore, as illustrated in FIG. 5, for example, the DB server 1 stores the statistical information 132, the execution plan 133, and cost information 134 in the information storage area 130.

The information reception unit 111 receives, for example, the target data 131 transmitted from the operation terminal 5.

The information reception unit 111 also receives, for example, a query transmitted from the operation terminal 5.

The information reception unit 111 further receives, for example, an execution result of the query transmitted from the DB server 2.

The information management unit 112 stores, for example, the target data 131 received by the information reception unit 111 in the internal DB 1*a*.

In addition, the information management unit 112 stores the statistical information 132 regarding the target data 131 stored in the internal DB 1*a* in the information storage area 130.

Furthermore, the information management unit 112 acquires the statistical information 132 from the external DBs 3 in the DB servers 2. Then, the information management unit 112 stores the acquired statistical information 132 in the information storage area 130.

The time measurement unit 113 measures a communication time taken for accessing each of the external DBs 3. For example, the time measurement unit 113 measures a communication time taken for accessing each of the external DBs 3 by using a packet internet groper (PING).

The relation specification unit 114 specifies relation between communication times taken for accessing the external DBs 3 based on measurement results of the communication times measured by the time measurement unit 113.

The load calculation unit 115 calculates, in response to receipt of a query by the information reception unit 111, a processing load when access is made to each of the external DBs 3 accompanying execution of the query, based on relation specified by the relation specification unit 114.

The access control unit 116 controls, according to processing loads calculated by the load calculation unit 115, access to the external DBs 3 that is performed accompanying execution of a query received by the information reception unit 111. For example, the access control unit 116 determines the execution plan 133 suitable for execution of the query received by the information reception unit 111.

The query execution unit 117 executes, under the control of the access control unit 116, a query received by the information reception unit 111. For example, the query execution unit 117 executes, by following the execution plan 133 determined by the access control unit 116, the query received by the information reception unit 111.

The information transmission unit 118 transmits, for example, a query received by the information reception unit 111 and the execution plan 133 determined by the access control unit 116 to the DB servers 2.

In addition, the information transmission unit 118 transmits, for example, an execution result of a query executed by the query execution unit 117 and an execution result of the query received by the information reception unit 111 to the operation terminal 5. The cost information 134 will be described later.

Next, the block diagram of the functions of the DB server 2 will be described.

As illustrated in FIG. 6, for example, in organic collaboration between hardware such as the CPU 201 and the memory 202 and the program 210, the DB server 2 implements various types of functions including an information reception unit 211, an information management unit 212, a query execution unit 213, and an information transmission unit 214.

In addition, as illustrated in FIG. 6, for example, the DB server 2 stores target data 231 in the external DB 3.

The information reception unit 211 receives, for example, the target data 231 transmitted from the operation terminal 5. In addition, the information reception unit 211 receives a query and the execution plan 133 transmitted from the DB server 1.

The information management unit 212 stores, for example, the target data 231 received by the information reception unit 211 in the external DB 3.

The query execution unit 213 executes, by following the execution plan 133 received by the information reception unit 211, a query received by the information reception unit 211.

The information transmission unit 214 transmits an execution result of a query executed by the query execution unit 213 to the DB server 1.

[Outline of Embodiment]

Figure 7:
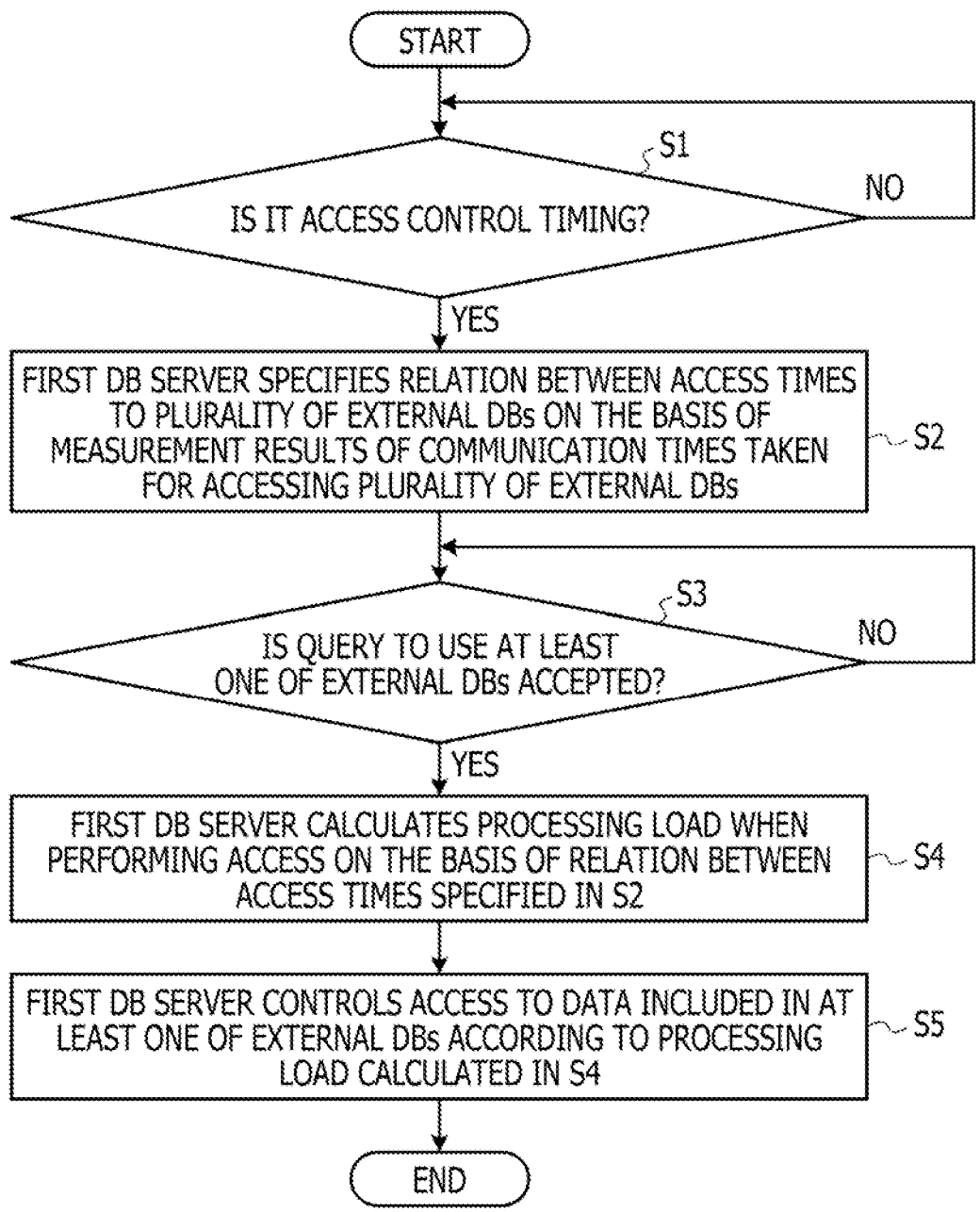
FIG. 7 is a flowchart diagram illustrating an outline of access control processing in a first embodiment.

Next, an outline of the embodiment will be described. FIG. 7 is a flowchart diagram illustrating an outline of the access control processing in the embodiment.

As illustrated in FIG. 7, for example, the DB server 1 waits until an access control timing comes (NO in S1). The access control timing may be, for example, a periodical timing such as every hour.

Then, when the access control timing comes (YES in S1), the DB server 1 specifies relation between access times to the plurality of external DBs 3 based on measurement results of communication times taken for accessing the plurality of external DBs 3 (S2).

Subsequently, the DB server 1 waits until a query to use at least one of the plurality of external DBs 3 is accepted (NO in S3).

Then, when accepting the query to use at least one of the plurality of external DBs 3 (YES in S3), the DB server 1 calculates a processing load when performing access based on the relation between the access times specified in the processing of S2 (S4).

Thereafter, the DB server 1 controls access to data included in at least one of the plurality of external DBs 3 according to the processing load calculated in the processing of S4 (S5).

For example, before accepting input of the query to be executed, the DB server 1 in the present embodiment calculates in advance the relation between the communication times taken for accessing the external DBs 3 from measurement results of the communication times taken for accessing the external DBs 3.

Then, when accepting input of the query to be executed, the DB server 1 refers to the relation between the communication times calculated in advance to calculate a processing load when executing the query to be executed by considering processing loads accompanying communication between the DB server 1 and the DB servers 2. Thereafter, based on the calculated processing load, for example, the DB server 1 determines the execution plan 133 to be used for executing the query to be executed.

With this configuration, the DB server 1 may appropriately select the execution plan 133 to be used for executing the query to be executed. Therefore, the DB server 1 may optimize access to the external DBs 3 accompanying execution of the query to be executed.

[Details of Embodiment]

Next, details of the embodiment will be described. FIGS. 8 to 13 are flowchart diagrams illustrating details of the access control processing in the embodiment. In addition, FIGS. 14 to 20 are diagrams illustrating details of the access control processing in the embodiment.

[Time Calculation Processing]

Figure 8:
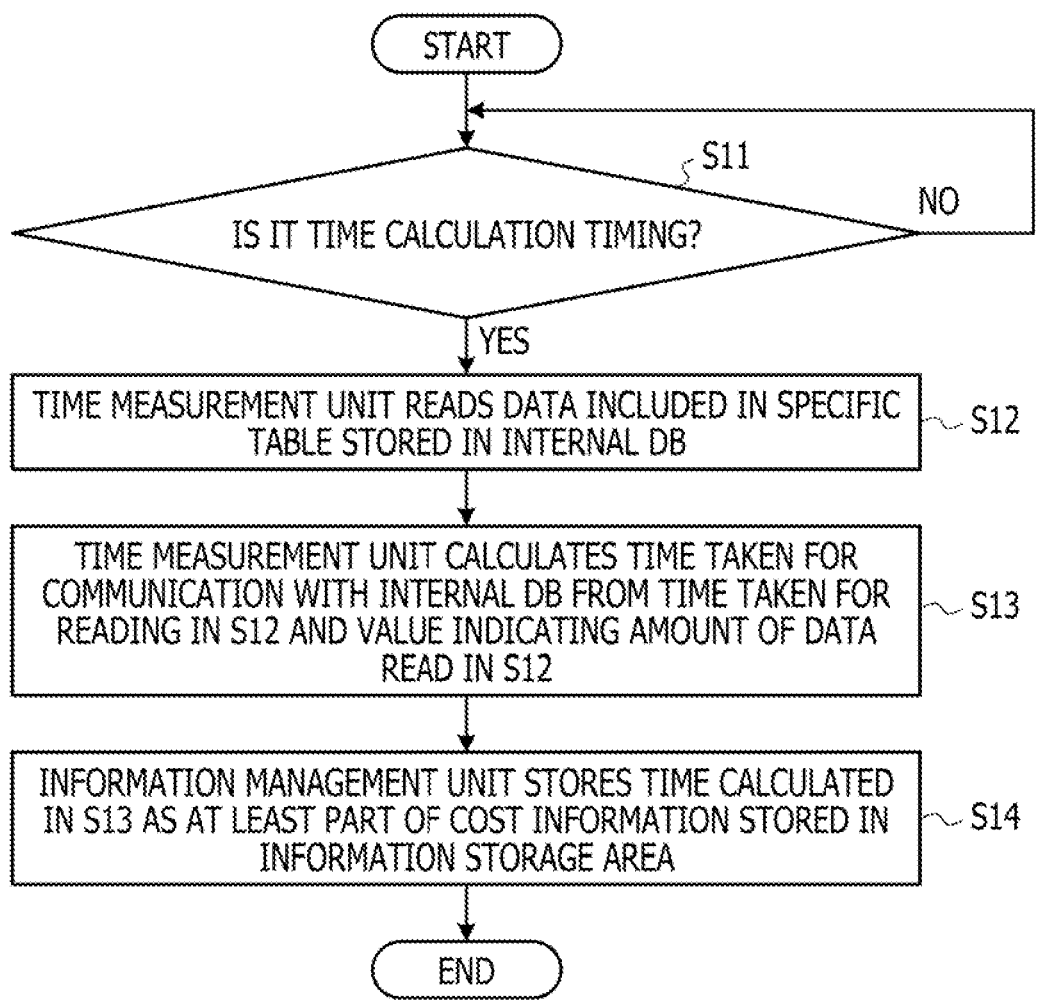
FIG. 8 is a flowchart diagram illustrating details of the access control processing in the first embodiment.

First, in the access control processing, processing in which the DB server 1 calculates a time taken for reading data included in a specific table stored in the internal DB 1a (hereinafter, also referred to as time calculation processing) will be described. FIG. 8 is a diagram illustrating the time calculation processing.

As illustrated in FIG. 8, the time measurement unit 113 of the DB server 1 waits until a time calculation timing comes (NO in S11). The time calculation timing may be, for example, a timing at which a start of the DB server 1 is completed.

Then, when the time calculation timing comes (YES in S11), the time measurement unit 113 reads data included in a specific table stored in the internal DB 1a (S12).

For example, the time measurement unit 113 reads data included in a table that is present in the internal DB 1a at all times (for example, a system catalog table) by a sequential scan (total scan).

Subsequently, the time measurement unit 113 calculates a time taken for communication with the internal DB 1a from a time taken for the reading in the processing of S12 and a value indicating an amount of the data read in the processing of S12 (S13).

For example, the time measurement unit 113 calculates a time taken for reading one page by dividing the time taken for reading the data included in the specific table in the processing of S12 by the number of pages corresponding to the data included in the specific table read in the processing of S12.

Thereafter, the information management unit 112 of the DB server 1 stores the time calculated in the processing of S13 as at least a part of the cost information 134 stored in the information storage area 130 (S14). Hereinafter, specific examples of the cost information 134 will be described.

[Specific Example (1) of Cost Information]

FIGS. 14 to 17 are diagrams illustrating the specific examples of the cost information 134. For example, FIG. 14 is a diagram illustrating a specific example of the cost information 134 before the processing of S14 is performed. In addition, FIG. 15 is a diagram illustrating a specific example of the cost information 134 after the processing of S14 is performed. Note that FIGS. 16 and 17 will be described later.

The cost information 134 illustrated in FIG. 14 and the like has, as items, "Type" in which an object of each cost is set, "Unit" in which a unit for calculating each cost is set, and "Cost" in which each cost is set. The cost information 134 illustrated in FIG. 14 and the like also has, as an item, "Measurement Time" in which the time calculated in the processing of S13 (time used for calculating each cost) is set.

For example, in the cost information 134 illustrated in FIG. 14, "Sequential Scan" is set as "Type", "Page" is set as "Unit", and "1" is set as "Cost" in the information in a first row.

For example, the information in the first row in the cost information 134 illustrated in FIG. 14 indicates that a cost (processing load) when data for one page (hereinafter, also referred to as data in a first size) stored in a database is read by a sequential scan is "1".

For example, the information in the first row in the cost information 134 illustrated in FIG. 14 indicates that a cost (hereinafter, also referred to as second cost or second processing load) when the DB server 1 reads data for one page stored in the internal DB 1a by a sequential scan (total scan) is "1". Similarly, for example, the information in the first row in the cost information 134 illustrated in FIG. 14 indicates that a cost when the DB server 2 reads data for one page stored in the external DB 3 by a sequential scan is "1".

In addition, in the cost information 134 illustrated in FIG. 14, "Index Scan" is set as "Type", "Page" is set as "Unit", and "4" is set as "Cost" in the information in a second row.

For example, the information in the second row in the cost information 134 illustrated in FIG. 14 indicates that a cost when data for one page stored in a database is read by using an index is "4".

For example, the information in the second row in the cost information 134 illustrated in FIG. 14 indicates that a cost when the DB server 1 reads data for one page stored in the internal DB 1a by using an index is "4". Similarly, for example, the information in the second row in the cost information 134 illustrated in FIG. 14 indicates that a cost when the DB server 2 reads data for one page stored in the external DB 3 by using an index is "4".

In addition, in the cost information 134 illustrated in FIG. 14, "CPU" is set as "Type", "Row" is set as "Unit", and "0.01" is set as "Cost" in the information in a third row.

For example, the information in the third row in the cost information 134 illustrated in FIG. 14 indicates that a cost of the CPU when data for one row (one record) (hereinafter, also referred to as data in a second size) stored in a database is read is "0.01".

Then, for example, when "10 (ms)" is calculated in the processing of S13, as illustrated in FIG. 15, the information management unit 112 sets "10 (ms)" as "Measurement Time" of the information in which "Sequential Scan" is set as "Type" (information in the first row).

Note that, in this case, as illustrated in FIG. 15, the information management unit 112 may set "-" indicating that no information is set as "Measurement Time" of the information in which "Index Scan" and "CPU" are set as "Type" (information in the second and third rows).

[Time Measurement Processing]

Figure 9:
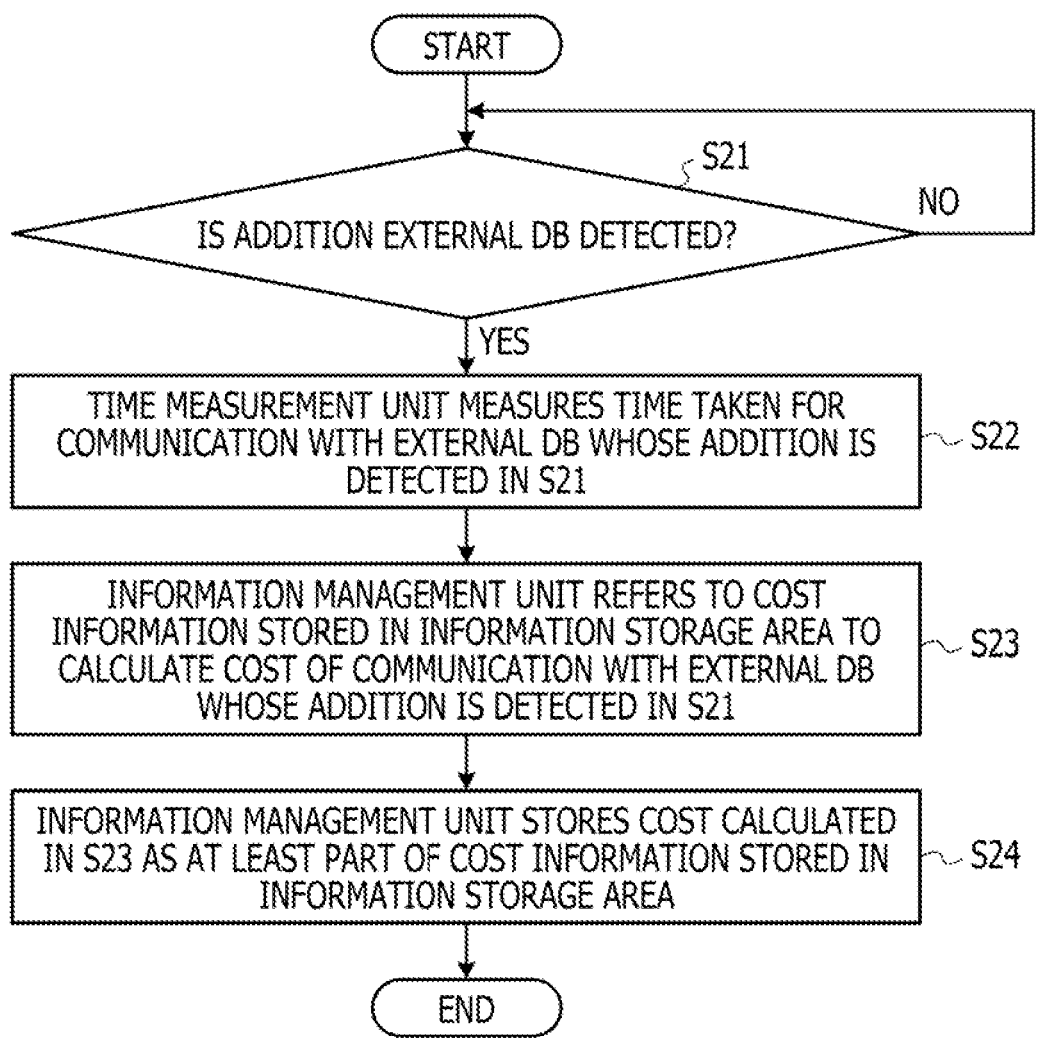
FIG. 9 is a flowchart diagram illustrating details of the access control processing in the first embodiment.

Next, in the access control processing, processing of measuring a time taken for accessing from the DB server 1 to each of the DB servers 2 (hereinafter, also referred to as time measurement processing) will be described. FIG. 9 is a diagram illustrating the time measurement processing.

As illustrated in FIG. 9, for example, the time measurement unit 113 of the DB server 1 waits until addition the external DB 3 to be accessed from the DB server 1 is detected (NO in S21).

Then, when the addition of the external DB 3 to be accessed from the DB server 1 is detected (YES in S21), the time measurement unit 113 measures a time taken for accessing the external DB 3 whose addition is detected in the processing of S21 (S22).

For example, the time measurement unit 113 measures a communication time taken for accessing each of the external DBs 3 by using a PING.

Subsequently, the information management unit 112 refers to the cost information 134 stored in the information storage area 130 to calculate a cost (hereinafter, also referred to as first cost or first processing load) of communication with the external DB 3 whose addition is detected in the processing of S21 (S23).

For example, the information management unit 112 calculates a ratio (hereinafter, also referred to as first ratio) of the time taken for reading a table by a sequential scan (time calculated in the processing of S13) to the time taken for accessing the external DB 3 whose addition is detected (time calculated in the processing of S22). Then, the information management unit 112 calculates a cost of access to the external DB 3 whose addition is detected such that a ratio of a cost of reading the table by the sequential scan to the cost of access to the external DB 3 whose addition is detected is equal to the first ratio.

Furthermore, for example, in the cost information 134 described with reference to FIG. 15, "1" and "10 (ms)" are respectively set as "Cost" and "Measurement Time" in the information in which "Sequential Scan" is set as "Type" (information in the first row). Thus, for example, when "5 (ms)" is measured as the time taken for communication with the added external DB 3a, the information management unit 112 calculates "0.5" as the cost (first cost) of communication with the external DB 3a.

Thereafter, the information management unit 112 stores the cost calculated in the processing of S23 as at least a part of the cost information 134 stored in the information storage area 130 (S24). Hereinafter, specific examples of the cost information 134 after the processing of S24 is performed will be described.

[Specific Example (2) of Cost Information]

FIGS. 16 and 17 are diagrams illustrating the specific examples of the cost information 134 after the processing of S24 is performed.

For example, in the cost information 134 illustrated in FIG. 16, "Communication (External DB 3a)" is set as "Type", "Row" is set as "Unit", "0.5" is set as "Cost", and "5 (ms)" is set as "Measurement Time" in the information in a fourth row (underlined portions). For example, the cost information 134 illustrated in FIG. 16 indicates that a cost (first cost) of communication with the external DB 3a is "0.5".

Note that, when a plurality of external DBs 3 is added, the information management unit 112 adds information corresponding to each of the added external DBs 3 as indicated in underlined portions of FIG. 17.

For example, in the cost information 134 illustrated in FIG. 17, "Communication (External DB 3b)" is set as "Type", "Row" is set as "Unit", "0.1" is set as "Cost", and "1 (ms)" is set as "Measurement Time" in the information in a fifth row (underlined portions).

In addition, in the cost information 134 illustrated in FIG. 17, "Communication (External DB 3c)" is set as "Type", "Row" is set as "Unit", "0.2" is set as "Cost", and "2 (ms)" is set as "Measurement Time" in the information in a sixth row (underlined portions).

For example, the cost information 134 illustrated in FIG. 17 indicates that the cost of communication with the external DB 3a is "0.5", a cost of communication with the external DB 3b is "0.1", and a cost of communication with the external DB 3c is "0.2".

[Information Acquisition Processing]

Figure 10:
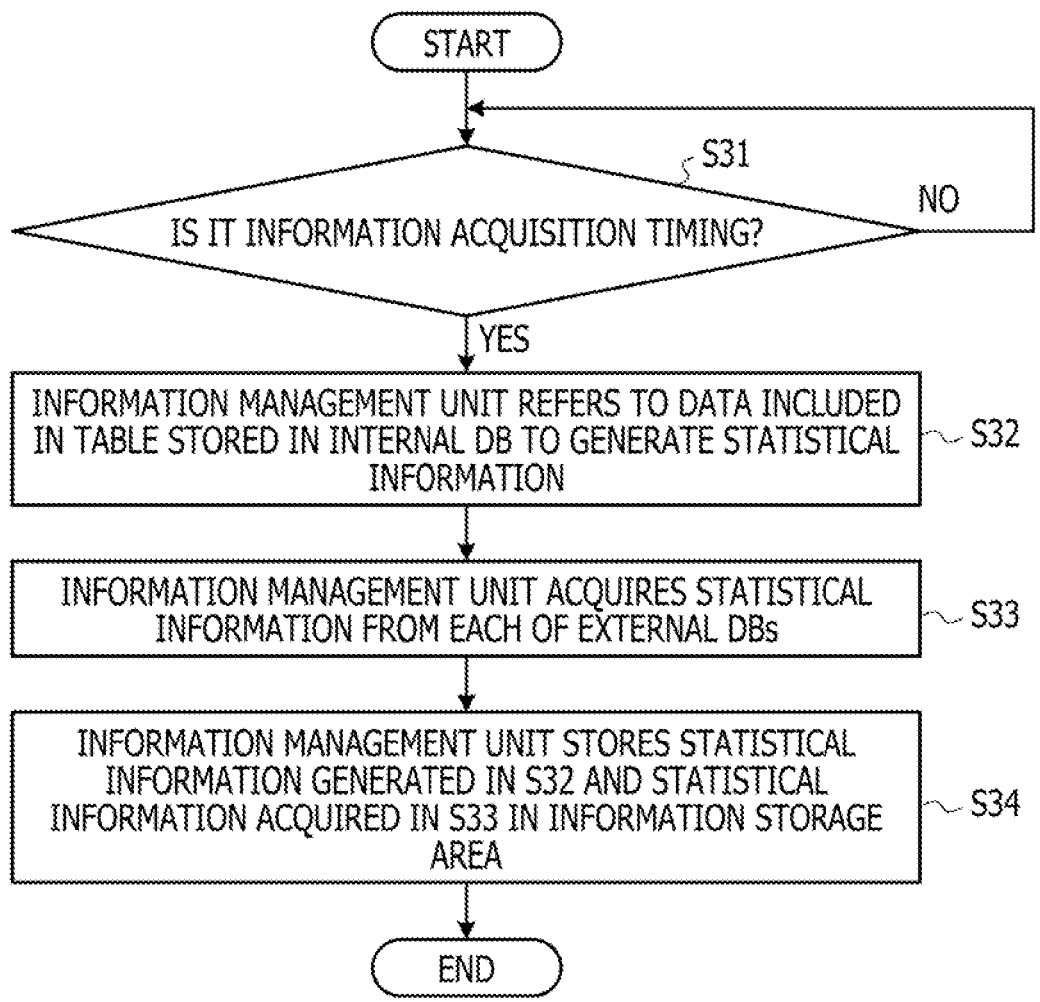
FIG. 10 is a flowchart diagram illustrating details of the access control processing in the first embodiment.

Next, in the access control processing, processing of acquiring the statistical information 132 (hereinafter, also referred to as information acquisition processing) will be described. FIG. 10 is a diagram illustrating the information acquisition processing.

As illustrated in FIG. 10, the information management unit 112 waits until an information acquisition timing comes (NO in S31). The information acquisition timing may be, for example, a periodical timing such as every hour.

Then, when the information acquisition timing comes (YES in S31), the information management unit 112 refers to data included in a table stored in the internal DB 1a to generate the statistical information 132 corresponding to the internal DB 1a (S32).

Furthermore, the information management unit 112 acquires the statistical information 132 corresponding to each of the external DBs 3 from each of the external DBs 3 (S33).

Thereafter, the information management unit 112 stores the statistical information 132 generated in the processing of S32 and the statistical information 132 acquired in the processing of S33 in the information storage area 130 (S34). Hereinafter, specific examples of the statistical information 132 will be described.

[Specific Examples of Statistical Information]

FIGS. 18 and 19 are diagrams illustrating the specific examples of the statistical information 132. For example, FIG. 18 is a diagram illustrating a specific example of the statistical information 132a corresponding to the internal DB 1a. In addition, FIG. 19 is a diagram illustrating a specific example of the statistical information 132b corresponding to the external DB 3a.

For example, the statistical information 132 illustrated in FIG. 18 and the like has, as items, "Table Name" in which identification information of each table stored in the internal DB 1a is set, and "The Number of Records" in which the number of records included in each table is set. For example, the statistical information 132 illustrated in FIG. 18 and the like also has, as an item, "The Number of Columns" in which the number of columns in each table is set.

Note that the statistical information 132 illustrated in FIG. 18 and the like may further has items such as the size of each column in each table, a cardinality of values in each column in each table, and a histogram of values in each column in each table.

For example, in the statistical information 132 illustrated in FIG. 18, "TBL101" is set as "Table Name", "2000" is set as "The Number of Records", and "10" is set as "The Number of Columns" in the information in a first row.

In addition, for example, in the statistical information 132 illustrated in FIG. 18, "TBL102" is set as "Table Name", "500" is set as "The Number of Records", and "5" is set as "The Number of Columns" in the information in a second row. A description for other information included in FIG. 18 is omitted.

In addition, for example, in the statistical information 132 illustrated in FIG. 19, "TBL201" is set as "Table Name", "700" is set as "The Number of Records", and "5" is set as "The Number of Columns" in the information in a first row.

In addition, for example, in the statistical information 132 illustrated in FIG. 19, "TBL202" is set as "Table Name", "1000" is set as "The Number of Records", and "10" is set as "The Number of Columns" in the information in a second row. A description for other information included in FIG. 19 is omitted.

[Main Processing of Access Control Processing]

Figure 11:
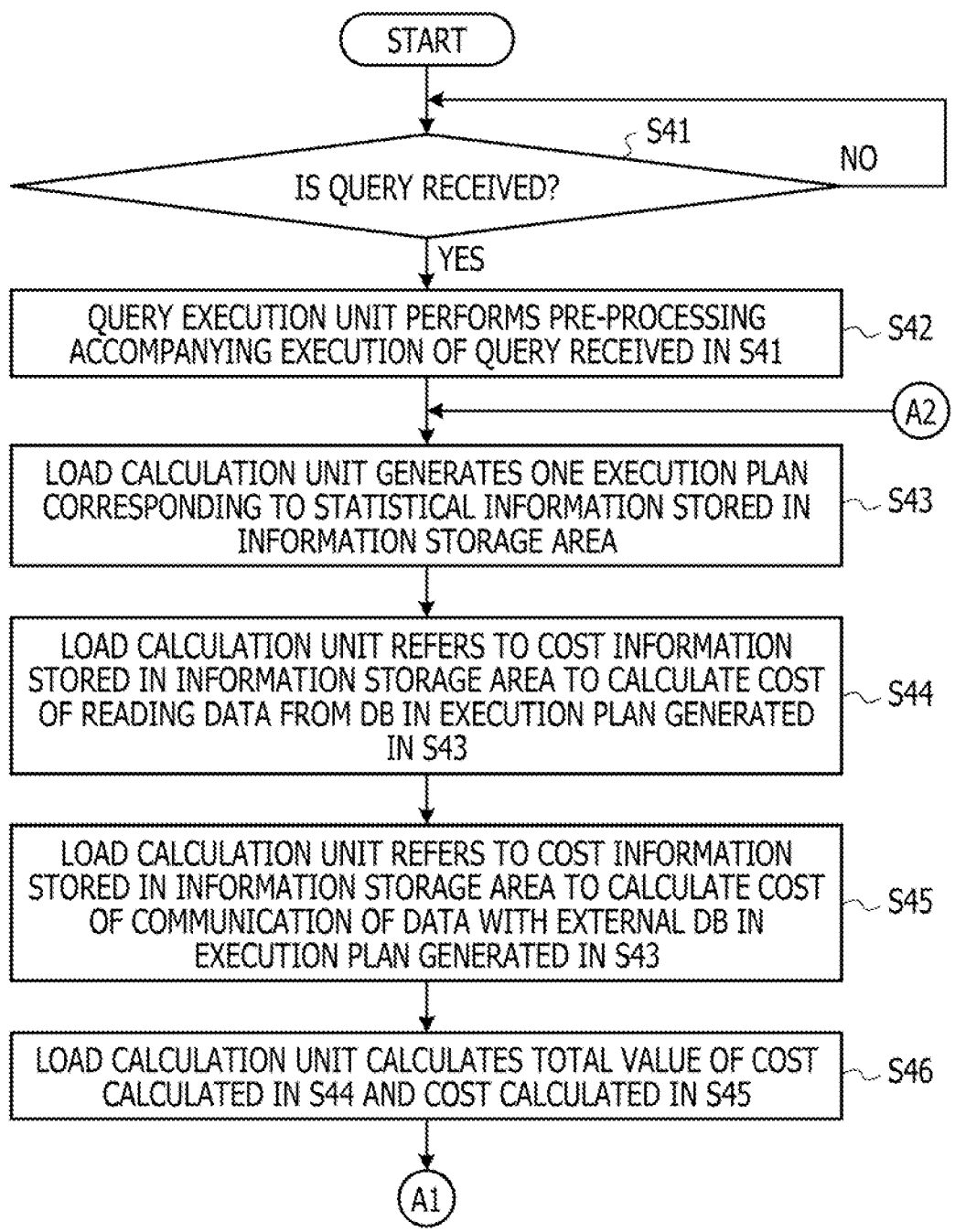
FIG. 11 is a flowchart diagram illustrating details of the access control processing in the first embodiment.
Figure 12:
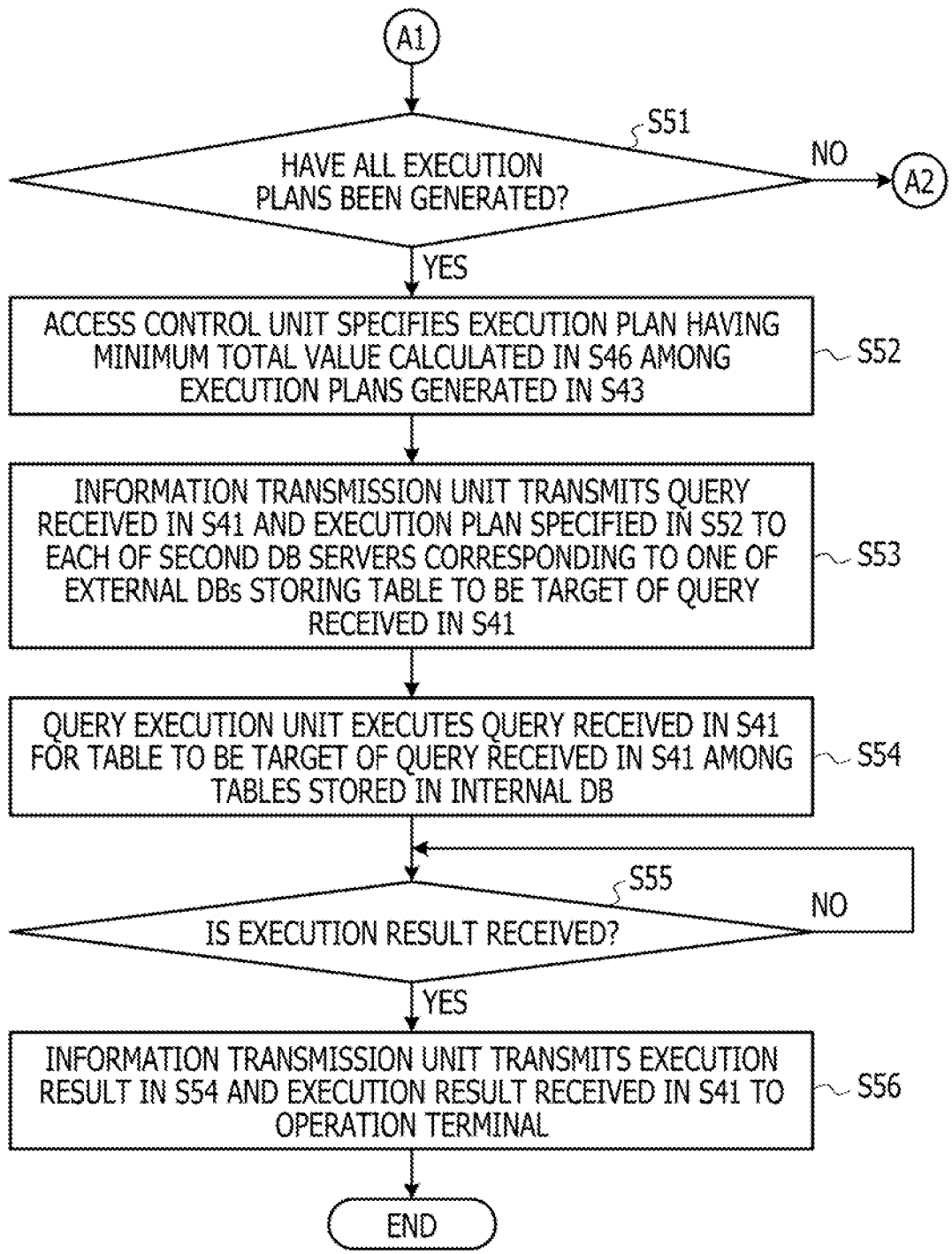
FIG. 12 is a flowchart diagram illustrating details of the access control processing in the first embodiment.
Figure 13:
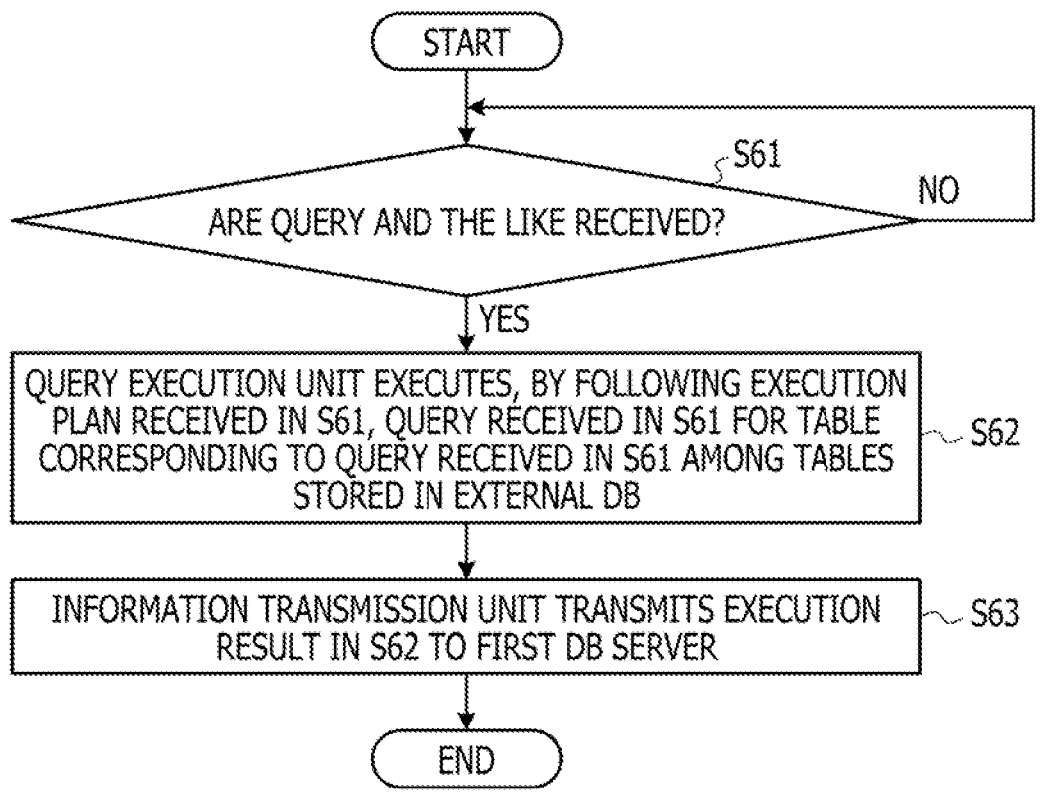
FIG. 13 is a flowchart diagram illustrating details of the access control processing in the first embodiment.

Next, main processing of the access control processing will be described. FIGS. 11 to 13 are diagrams illustrating the main processing of the access control processing.

[Processing in First DB Server]

First, the access control processing in the DB server 1 will be described. FIGS. 11 and 12 are diagrams illustrating the access control processing in the DB server 1.

As illustrated in FIG. 11, for example, the information reception unit 111 waits until a query transmitted from the operation terminal 5 is received (NO in S41).

Then, the query execution unit 117 of the DB server 1 performs pre-processing accompanying execution of the query received in the processing of S41 (S42).

For example, the query execution unit 117 performs a syntax check of the query received in the processing of S41, a presence check of a table to be a target of the query, and the like.

Subsequently, the load calculation unit 115 of the DB server 1 generates one execution plan 133 corresponding to the statistical information 132 stored in the information storage area 130 (S43). Hereinafter, a specific example of the execution plan 133 will be described.

[Specific Example of Execution Plan]

FIG. 20 is a diagram illustrating the specific example of the execution plan 133. For example, the example illustrated in FIG. 20 is an example of a case where the execution plan 133 is generated a plurality of times in the processing of S43.

The execution plan 133 illustrated in FIG. 20 has, as items, "Search Method" in which a search method (access order) for data included in a table stored in a database is set, and "Join Method" in which a join method of a plurality of tables is set.

For example, in the execution plan 133 illustrated in FIG. 20, "Sequential Scan" is set as "Search Method" and "Nested Loop Join" is set as "Join Method" in the information in a first row.

In addition, in the execution plan 133 illustrated in FIG. 20, for example, "Index Scan" is set as "Search Method" and "Nested Loop Join" is set as "Join Method" in the information in a second row. A description for other information included in FIG. 20 is omitted.

Referring back to FIG. 11, the load calculation unit 115 refers to the cost information 134 stored in the information storage area 130 to calculate a cost (hereinafter, also referred to as fourth cost or fourth processing load) of reading data (hereinafter, also referred to as data in a fourth size) from each database in the execution plan 133 generated in the processing of S43 (S44).

Then, the load calculation unit 115 refers to the cost information 134 stored in the information storage area 130 to calculate a cost (hereinafter, also referred to as third cost or third processing load) of communication of data (hereinafter, also referred to as data in a third size) with the external DB 3 in the execution plan 133 generated in the processing of S43 (S45).

Furthermore, the load calculation unit 115 calculates a total value of the cost calculated in the processing of S44 and the cost calculated in the processing of S45 (S46).

For example, the load calculation unit 115 calculates a total of the cost needed for the DB server 1 to acquire data stored in the internal DB 1a, the cost needed for the DB server 2 to acquire data stored in the external DB 3, and the cost accompanying communication between the DB server 1 and each of the DB servers 2.

With this configuration, the DB server 1 may calculate the total value of the costs when executing the query received in the processing of S41 by following the execution plan generated in the processing of S43.

Note that, hereinafter, when the execution plan 133 generated in the processing of S43 is the execution plan 133 for performing a sequential scan, the total value calculated in the processing of S46 is also referred to as a fifth processing load. In addition, hereinafter, when the execution plan 133 generated in the processing of S43 is the execution plan 133 for performing an index scan, the total value calculated in the processing of S46 is also referred to as a sixth processing load.

Thereafter, as illustrated in FIG. 12, the load calculation unit 115 determines whether or not all the execution plans 133 have been generated in the processing of S43 (S51).

As a result, when determining that not all the execution plans 133 have been generated in the processing of S43 (NO in S51), the load calculation unit 115 performs the processing of S43 and subsequent steps.

On the other hand, when determining that all the execution plans 133 have been generated in the processing of S43 (YES in S51), the access control unit 116 of the DB server 1 specifies, for example, the execution plan 133 having the minimum total value calculated in the processing of S46 among the execution plans 133 generated in the processing of S43 (S52).

For example, the access control unit 116 specifies the execution plan 133 having the minimum total value calculated in the processing of S46 as the execution plan 133 suitable for execution of the query received in the processing of S41.

Then, the information transmission unit 118 of the DB server 1 transmits the query received in the processing of S41 and the execution plan 133 specified in the processing of S52 to each of the DB servers 2 corresponding to one of the external DBs 3 storing a table to be a target of the query received in the processing of S41 (S53).

Note that, in this case, the DB server 1 may decompose the query received in the processing of S41 into a plurality of queries that needs to be executed by the DB servers 2. Then, the information transmission unit 118 may transmit a query corresponding to each of the DB servers 2 (query obtained by the decomposition) to each of the DB servers 2 corresponding to one of the external DBs 3 storing the table to be a target of the query received in the processing of S41.

Furthermore, the query execution unit 117 executes the query received in the processing of S41 for a table to be a target of the query received in the processing of S41 among tables stored in the internal DB 1a (S54).

For example, the query execution unit 117 executes, by following the execution plan 133 specified in the processing of S52, the query received in the processing of S41.

Thereafter, the information reception unit 111 waits until a result of execution of the query is received from each of the DB servers 2 that have transmitted the query and the like in the processing of S53 (NO in S55).

Then, when receiving the result of execution of the query from all of the DB servers 2 that have transmitted the query and the like in the processing of S53, (YES in S55), the information transmission unit 118 transmits, for example, the execution result in the processing of S54 and the execution result received in the processing of S41 to the operation terminal 5 (S56).

For example, in this case, the information transmission unit 118 may combine, process, total, and sort the execution result in the processing of S54 and the execution result received in the processing of S41. Then, the information transmission unit 118 may transmit the execution result obtained by the combining and the like to the operation terminal 5.

Note that, for example, when the query received in the processing of S41 does not target a table stored in the external DB 3, the information transmission unit 118 does not have to perform the processing of S53 and S55. In addition, for example, when the query received in the processing of S41 does not target a table stored in the internal DB 1a, the information transmission unit 118 does not have to perform the processing of S54.

[Processing in Second DB Server]

Next, the access control processing in the DB server 2 will be described. FIG. 13 is a diagram illustrating the access control processing in the DB server 2.

As illustrated in FIG. 13, the information reception unit 211 of the DB server 2 waits until a query and the execution plan 133 transmitted from the DB server 1 are received (NO in S61).

Then, when receiving the query and the like transmitted from the DB server 1 (YES in S61), the query execution unit 213 of the DB server 2 executes the query received in the processing of S61 for a table corresponding to the query received in the processing of S61 among tables stored in the external DB 3 (S62).

For example, the query execution unit 213 executes, by following the execution plan 133 received in the processing of S61, the query received in the processing of S61.

Thereafter, the information transmission unit 214 of the DB server 2 transmits an execution result in the processing of S62 to the DB server 1 (S63).

[Specific Example of Access Control Processing]

Next, a specific example of the access control processing in the present embodiment will be described. Hereinafter, a table in which "Table Name" is "TBL103" is also referred to as table TBL103, and a table in which "Table Name" is "TBL204" is also referred to as table TBL204. In addition, hereinafter, the description will be made assuming that 100 records are stored in one (page) in the table TBL103 and the table TBL204.

For example, when receiving a query determined to need joining of 1000 records stored in the table TBL103 and 2000 records stored in the table TBL204 in the processing of S41, the DB server 1 generates, in the processing of S43, a plurality of execution plans 133 corresponding to the received query.

For example, the DB server 1 generates the execution plan 133 (hereinafter, also referred to as execution plan 133a) for performing an index scan on the records stored in the table TBL103 and the table TBL204, and performing a nested loop join by using the table TBL103 and the table TBL204 as an inner table and an outer table, respectively.

In addition, for example, the DB server 1 generates the execution plan 133 (hereinafter, also referred to as execution plan 133b) for performing an index scan on the records stored in the table TBL103 and the table TBL204, and performing a nested loop join by using the table TBL103 and the table TBL204 as an outer table and an inner table, respectively.

Then, in the processing of S44, the DB server 1 calculates, for example, a cost (processing load) of reading data from each table for each of the plurality of execution plans 133.

For example, in the statistical information 132a illustrated in FIG. 18, "TBL103" is set as "Table Name" and "10000" is set as "The Number of Records" in the information in a third row. For example, the statistical information 132a illustrated in FIG. 18 indicates that the records corresponding to 100 (pages) are stored in the table TBL103. In addition, in the statistical information 132b illustrated in FIG. 19, "TBL204" is set as "Table Name" and "20000" is set as "The Number of Records" in the information in a fourth row. For example, the statistical information 132b illustrated in FIG. 19 indicates that the records corresponding to 200 (pages) are stored in the table TBL204.

Furthermore, in the cost information 134 illustrated in FIG. 17, "Sequential Scan" is set as "Type", "Page" is set as "Unit", and "1" is set as "Cost" in the information in a first row. In addition, in the cost information 134 illustrated in FIG. 17, "CPU" is set as "Type", "Row" is set as "Unit", and "0.01" is set as "Cost" in the information in a third row.

Therefore, in the processing of S44, the DB server 1 calculates, for example, "200" obtained by adding "100", which is a product of "100 (pages)" and "1", and "100", which is a product of "10000" and "0.01", as a cost of reading data from the table TBL103 when the execution plan 133a is followed.

In addition, in the processing of S44, the DB server 1 calculates, for example, "400" obtained by adding "200", which is a product of "200 (pages)" and "1", and "200", which is a product of "20000" and "0.01", as a cost of reading data from the table TBL204 when the execution plan 133a is followed.

Subsequently, in the processing of S45, the DB server 1 calculates, for example, a cost (processing load) of communication with each of the DB servers 2 for each of the plurality of execution plans 133.

For example, in the cost information 134 illustrated in FIG. 17, "Communication (External DB 3a)" is set as "Type", "Row" is set as "Unit", and "0.5" is set as "Cost" in the information in a fourth row. In addition, in the cost information 134 illustrated in FIG. 17, "Communication (External DB 3b)" is set as "Type", "Row" is set as "Unit", and "0.1" is set as "Cost" in the information in the fifth row.

Furthermore, the number of the records received from the DB server 2a (DB server 2 including the external DB 3a that stores the table TBL103) accompanying execution of the query received in the processing of S41 is determined to be "1000" from the statistical information 132. In addition, the number of the records received from the DB server 2b (DB server 2 including the external DB 3b that stores the table TBL204) accompanying execution of the query received in the processing of S41 is determined to be "2000" from the statistical information 132.

Therefore, in the processing of S45, the DB server 1 calculates, for example, "500", which is a product of "1000" and "0.5", as a cost of communication with the DB server 2a when the execution plan 133a is followed.

In addition, in the processing of S45, the DB server 1 calculates, for example, "200", which is a product of "2000" and "0.1", as a cost of communication with the DB server 2b when the execution plan 133a is followed.

Thereafter, in the processing of S46, the DB server 1 calculates a total of the cost calculated in the processing of S44 and the cost calculated in the processing of S45.

For example, when "200", "400", "500", and "200" are calculated in the processing of S44 and S45 as costs when the execution plan 133a is followed, the information processing apparatus 1 calculates "1300", which is a total of these costs.

In addition, a cost of access to the table TBL103 ("700", which is a sum of "200" and "500") is greater than a cost of access to the table TBL204 ("600", which is a sum of "400" and "200"). Therefore, the information processing apparatus 1 determines that, when a nested loop join between the table TBL103 and the table TBL204 is performed, a time taken for the join between the table TBL103 and the table TBL204 may be shortened by using the table TBL103 as an inner table and the table TBL204 as an outer table.

Therefore, in the processing of S52, for example, the information processing apparatus 1 determines that the execution plan 133a is more appropriate than the execution plan 133b as the execution plan 133 followed at the time of execution of the query received in the processing of S41. Then, for example, when determining that the cost "1300" calculated for the execution plan 133a is the minimum, the information processing apparatus 1 specifies the execution plan 133a as the execution plan 133 followed at the time of execution of the query received in the processing of S41.

With this configuration, the information processing apparatus 1 may appropriately select the execution plan 133 corresponding to the query received in the processing of S41.

Note that, for example, in the processing of S52, when only the cost calculated in the processing of S44 is used to specify the execution plan 133, which is when the execution plan 133 is specified without considering the cost calculated in the processing of S45, the cost of access to the table TBL103 ("200") is smaller than the cost of access to the table TBL204 ("400").

Thus, in this case, the information processing apparatus 1 determines that a time taken for execution of the query received in the processing of S41 may be shortened by using the table TBL103 as an outer table and the table TBL204 as an inner table. Therefore, in this case, the information processing apparatus 1 specifies the execution plan 133b as the execution plan 133 followed at the time of execution of the query received in the processing of S41.

For example, the information processing apparatus 1 determines, in the processing of S52, the execution plan 133 in consideration of the cost calculated in the processing of S45, so that the execution plan 133 to be used for executing the query received in the processing of S41 may be determined more appropriately.

As described above, the DB server 1 in the present embodiment specifies relation between communication times taken for accessing the plurality of external DBs 3 based on measurement results of the communication times taken for accessing the plurality of external DBs 3. Then, when accepting processing using at least one of the plurality of external DBs 3, the DB server 1 calculates a processing load when performing access based on the relation between the communication times taken for performing access.

Thereafter, the DB server 1 controls access to data included in at least one of the plurality of external DBs 3 according to the calculated processing load.

For example, before accepting input of the query to be executed, the DB server 1 in the present embodiment calculates in advance the relation between the communication times taken for accessing the external DBs 3 from measurement results of the communication times taken for accessing the external DBs 3.

Then, when accepting input of the query to be executed, the DB server 1 refers to the relation between the communication times calculated in advance to calculate a processing load when executing the query to be executed by considering processing loads accompanying communication between the DB server 1 and the DB servers 2. Thereafter, based on the calculated processing load, for example, the DB server 1 determines the execution plan 133 to be used for executing the query to be executed.

With this configuration, the DB server 1 may appropriately select the execution plan 133 to be used for executing the query to be executed. Therefore, the DB server 1 may optimize access to the external DBs 3 accompanying execution of the query to be executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable media having stored an information processing program that causes a computer to execute a process comprising:

by the computer:
receiving a query for accessing data included in at least one of a plurality of external databases;
specifying, based on measurement results of communication times taken for accessing the plurality of external databases, relation between the communication times taken for accessing the plurality of external databases;
calculating, when accepting an instruction to execute processing using the at least one of the plurality of external databases, at least one processing load when accessing the at least one of the plurality of external databases, based on the relation between the communication times;
controlling an access to the data included in the at least one of the plurality of external databases according to a calculated minimum processing load among the at least one processing load; and
executing the query based on the calculated minimum processing load, wherein
in the specifying the relation between the communication times, a ratio of the communication times taken for accessing the plurality of external databases is calculated, and
in the calculating the at least one processing load,
a first processing load corresponding to each of the at least one of the plurality of external databases is calculated such that a ratio of the communication times taken for accessing the at least one of the plurality of external databases and a ratio of the first processing loads accompanying communication of data in a first size with the at least one of the plurality of external databases match, and
based on the calculated first processing load, the at least one processing load when accessing the at least one of the plurality of external databases is calculated, wherein
in the specifying the relation between the communication times,
an acquisition time taken for acquisition of data from an internal database included in the computer is measured, and
a ratio of the measured acquisition time to the communication time taken for accessing each of the plurality of external databases is calculated, and
in the calculating the at least one processing load,
a second processing load accompanying acquisition of data in a second size from the internal database is acquired from a storage unit,
the first processing load corresponding to each of the at least one of the plurality of external databases is calculated such that a ratio of the measured acquisition time to the communication time taken for accessing the at least one of the plurality of external databases and a ratio of the acquired second processing load to the first processing load corresponding to each of the at least one of the plurality of external databases match, and
based on the calculated first processing load and the second processing load, the at least one processing load when accessing the at least one of the plurality of external databases is calculated.

2. The non-transitory computer-readable media according to claim 1, wherein
in the calculating the processing load,
based on the first processing load, a third processing load accompanying communication of data in a third size with each of the at least one of the plurality of external databases is calculated, the data in the third size being generated accompanying execution of processing corresponding to an execution instruction,
based on the second processing load, a fourth processing load accompanying acquisition of data in a fourth size generated in each of the at least one of the plurality of external databases is calculated, the data in the fourth size being generated accompanying execution of processing corresponding to the execution instruction, and
a total of the calculated third processing load and the calculated fourth processing load is calculated as the at least one processing load when accessing the at least one of the plurality of external databases.

3. The non-transitory computer-readable media according to claim 2, wherein
in the calculating the at least one processing load,
the third processing load is calculated by multiplying a value calculated by dividing the third size by the first size by the first processing load, and
the fourth processing load is calculated by multiplying a value calculated by dividing the fourth size by the first size by the second processing load.

4. The non-transitory computer-readable media according to claim 1, wherein
in the calculating the at least one processing load, the processing load is calculated for each of a plurality of execution plans when accessing data included in the at least one of the external databases, based on the relation between the communication times, and
in the controlling access, the access to data included in the at least one of the external databases is controlled by following an execution plan having a minimum processing load among the plurality of execution plans.

5. The non-transitory computer-readable media according to claim 1, the process further comprising:
measuring, when a new external database is added as an external database to be accessed, a communication time taken for accessing the new external database; and
specifying relation between the communication time taken for accessing each of the plurality of external databases and the communication time taken for accessing the new external database based on the measurement results of the communication times taken for accessing the plurality of external databases and a measurement result of the communication time taken for accessing the new external database.

6. The non-transitory computer-readable media according to claim 1, wherein
in the controlling access, an order of access to data included in a plurality of tables stored in the at least one of the plurality of external databases is determined.

7. The non-transitory computer-readable media according to claim 6, wherein
in the controlling access, the order of access is determined such that the access is performed in order from a table having less number of pieces of data among the plurality of tables, when the data included in the plurality of tables stored in the at least one of the plurality of external database is accessed.

8. The non-transitory computer-readable media according to claim 1, wherein in the controlling access, a search method for the data included in the at least one of the plurality of external databases is determined.

9. The non-transitory computer-readable media according to claim 8, wherein
in the calculating the at least one processing load, when accessing a specific table stored in the at least one of the plurality of external databases, a fifth processing load when accessing data included in the specific table by performing a total scan of the data included in the specific table, and a sixth processing load when accessing the data included in the specific table by referring to an index for the specific table, and
in the controlling access, when the fifth processing load is greater than the sixth processing load, access is made to the data included in the specific table by referring to the index for the specific table, and when the sixth processing load is greater than the fifth processing load, access is made to the data included in the specific table by performing a total scan of the data included in the specific table.

10. An information processing apparatus comprising:
a memory, and
a processor coupled to the memory and configured to:
  receive a query for accessing data included in at least one of a plurality of external databases;
  specify, by the processor and based on measurement results of communication times taken for accessing the plurality of external databases, relation between the communication times taken for accessing the plurality of external databases;
  calculate, by the processor and when accepting an instruction to execute processing using the at least one of the plurality of external databases, at least one processing load when accessing the at least one of the plurality of external databases, based on the relation between the communication times;
  control, by the processor, an access to the data included in the at least one of the plurality of external databases according to a minimum calculated processing load among the at least one processing load; and
  execute the query based on the calculated minimum processing load, wherein
  in the specify the relation between the communication times,
  a ratio of the communication times taken for accessing the plurality of external databases is calculated,
  an acquisition time taken for acquisition of data from an internal database included in the computer is measured, and
  a ratio of the measured acquisition time to the communication time taken for accessing each of the plurality of external databases is calculated, and
  in the calculate the at least one processing load,
  a first processing load corresponding to each of the at least one of the plurality of external databases is calculated such that a ratio of the communication times taken for accessing the at least one of the plurality of external databases and a ratio of the first processing loads accompanying communication of data in a first size with the at least one of the plurality of external databases match,
  based on the calculated first processing load, the at least one processing load when accessing the at least one of the plurality of external databases is calculated, a second processing load accompanying acquisition of data in a second size from the internal database is acquired from a storage unit,
the first processing load corresponding to each of the at least one of the plurality of external databases is calculated such that a ratio of the measured acquisition time to the communication time taken for accessing the at least one of the plurality of external databases and a ratio of the acquired second processing load to the first processing load corresponding to each of the at least one of the plurality of external databases match, and
based on the calculated first processing load and the second processing load, the at least one processing load when accessing the at least one of the plurality of external databases is calculated.

11. The information processing apparatus according to claim 10, wherein
in the calculate the at least one processing load, the at least one processing load is calculated for each of a plurality of execution plans when accessing data included in the at least one of the plurality of external databases, based on the relation between the communication times, and
in the control access, the access to data included in the at least one of the plurality of external databases is controlled by following an execution plan having a minimum processing load among the plurality of execution plans.

12. An information processing method to be performed by a computer, the method comprising:
receiving a query for accessing data included in at least one of a plurality of external databases;
specifying, by the computer and based on measurement results of communication times taken for accessing the plurality of external databases, relation between the communication times taken for accessing the plurality of external databases;
calculating, by the computer and when accepting an instruction to execute processing using the at least one of the plurality of external databases, at least one processing load when accessing the at least one of the plurality of external databases, based on the relation between the communication times;
controlling, by the computer, an access to the data included in the at least one of the plurality of external databases according to a minimum calculated processing load among the at least one processing load; and
executing the query based on the calculated minimum processing load, wherein
in the specifying the relation between the communication times,
a ratio of the communication times taken for accessing the plurality of external databases is calculated,
an acquisition time taken for acquisition of data from an internal database included in the computer is measured, and
a ratio of the measured acquisition time to the communication time taken for accessing each of the plurality of external databases is calculated, and
in the calculating the at least one processing load,
a first processing load corresponding to each of the at least one of the plurality of external databases is calculated such that a ratio of the communication times taken for accessing the at least one of the plurality of external databases and a ratio of the first processing loads accompanying communication of data in a first size with the at least one of the plurality of external databases match, and based on the calculated first processing load, the at least one processing load when accessing the at least one of the plurality of external databases is calculated, a second processing load accompanying acquisition of data in a second size from the internal database is acquired from a storage unit, the first processing load corresponding to each of the at least one of the plurality of external databases is calculated such that a ratio of the measured acquisition time to the communication time taken for accessing the at least one of the plurality of external databases and a ratio of the acquired second processing load to the first processing load corresponding to each of the at least one of the plurality of external databases match, and based on the calculated first processing load and the second processing load, the at least one processing load when accessing the at least one of the plurality of external databases is calculated.

13. The information processing method according to claim 12, wherein in the calculating the at least one processing load, the at least one processing load is calculated for each of a plurality of execution plans when accessing data included in the at least one of the external databases, based on the relation between the communication times, and in the controlling access, the access to data included in the at least one of the plurality of external databases is controlled by following an execution plan having a minimum processing load among the plurality of execution plans.

* * * * *